United States Patent [19]

Peterson

[11] 3,759,541
[45] Sept. 18, 1973

[54] STABILIZER FOR ARTICULATED WHEEL LOADERS

[75] Inventor: Robert A. Peterson, San Leandro, Calif.

[73] Assignee: Caterpillar Tractor Co., Peoria, Ill.

[22] Filed: Dec. 22, 1971

[21] Appl. No.: 210,773

[52] U.S. Cl. .......................... 280/112 R, 267/63 R
[51] Int. Cl. ............................................. B60g 11/22
[58] Field of Search ................ 267/63 R; 280/112 R

[56] References Cited
UNITED STATES PATENTS

| | | | |
|---|---|---|---|
| 3,625,531 | 12/1971 | Ranzenhofer | 280/112 R |
| 3,481,623 | 12/1969 | Campbell | 267/63 R |
| 3,118,659 | 1/1964 | Paulsen | 267/63 R |
| 3,263,985 | 8/1966 | Planta | 267/63 R |
| 3,542,353 | 11/1970 | Hickman | 267/63 R |

Primary Examiner—Philip Goodman
Attorney—Leonard Phillips et al.

[57] ABSTRACT

A stabilizer for improving the lateral stability of an articulated wheel loader of the type having a rigid front axle and an oscillating rear axle or frame. The stabilizer comprises rubber-like resilient members mounted between the rear axle and frame having an exponentially increasing restraining force versus compressive deflection characteristic to prevent free and unrestrained oscillation of the axle in relation to the frame at excessive angles of axle oscillation, thereby increasing the lateral tipping angle of the loader.

9 Claims, 4 Drawing Figures

INVENTOR
ROBERT A. PETERSON 3,759,541

STABILIZER FOR ARTICULATED WHEEL LOADERS

BACKGROUND OF THE INVENTION

Present day articulated wheel loaders have a rigid front axle and an oscillating rear axle or frame. The front axle is rigid with the frame to provide front frame stability to carry a loader bucket successfully. The rear axle or frame oscillates to allow the loader to traverse uneven ground while retaining all wheels on the ground for uniform tractive effort, and to prevent undue strain of frame components.

However, the oscillating rear axle poses problems when the loader is operated on side slopes or over rough terrain. Since the rear axle is allowed to oscillate freely, it does not lend stability to the loader until the axle reaches its maximum point of oscillation or stop position. In this regard, the lateral tipping line of the loader extends diagonally from a front wheel of the vehicle to the pivot axis of axle oscillation centrally of the rear axle, until such time as the rear axle reaches its stop position. The tipping line then shifts to a position extending through the front and rear wheels of the loader just as if both axles were rigid. In other words the lateral tipping angle abruptly shifts from a relatively small value that lies inwardly of a line through the ground support points of the wheels on one side of the loader, to a substantially larger angle that intersects such line. Unfortunately, the extent of maximum oscillatory deflection of the axle to its stop position requisite to shifting of the tipping angle to its increased value is frequently beyond the useful stability range of the loader.

The hereinbefore noted stability problem has become significantly more acute as the size of loaders has increased. It is especially prevalent in various loaders where tread width has been held to a minimum for reasons of space limitation and the operator has been positioned high off the ground for increased visibility. As a result, small lateral movements of such a loader at ground level are amplified into large movements at the operator's station, thus giving the operator an apparent sense of instability.

In view of the lateral stability problem of articulated loaders, various arrangements have been heretofore devised for stabilizing the oscillating rear axle. In one arrangement, hydraulic jacks are coupled between the frame and points of the rear axle on laterally opposite sides of its pivot. The jacks are arranged to normally reciprocate to permit free oscillation of the axle, while being selectively energized to exert stabilizing restraining force on the axle. A complex hydraulic control system is necessarily associated with the jacks to facilitate such selective energization. Aside from the relative complexity and expense of such a hydraulic stabilizing system, the system requires operator manipulation and control in its operation.

In another prior art stabilizing system, a torsional elastic connection is employed between the oscillating rear axle and frame for the purpose of dampening shocks and resisting oscillation. However, this system is disadvantageous in that it is not readily adaptable to existing machines.

A further system which has been heretofore devised involves the use of coil springs between the frame and oscillating rear axle to resist oscillation. This sytem is limited in that the restraining force versus deflection characteristic of the coil springs is generally not particularly well suited to providing optimum stability, and the springs are relatively susceptible to breakage. Further, the springs tend to be insufficiently damped such that under some circumstances they may actually cause a build-up of oscillation in acting to exert restraining force on the axle.

SUMMARY OF THE INVENTION

The general object of the present invention is to provide a means of improving the lateral stability of an articulated wheel loader having an oscillating rear axle, which means are simple, reliable, readily adaptable to existing machines, have low initial and maintenance costs, and automatically provide an optimum of lateral stability as required while yet allowing substantially free axle oscillation and good roadability over relatively smooth surfaces.

In the accomplishment of the foregoing and other objects and advantages, lateral stabilizing means in accordance with the present invention generally comprise a pair of variable displacement rate rubber-like resilient compression members disposed between the frame and oscillating rear axle of an articulated wheel loader on laterally opposite sides of its pivot connection, such members having a rapidly exponentially increasing restraining force versus compressive displacement characteristic to impart a progressively greater restraint to axle oscillation as the angle thereof increases.

DETAILED DESCRIPTION OF THE INVENTION

Figure 1:
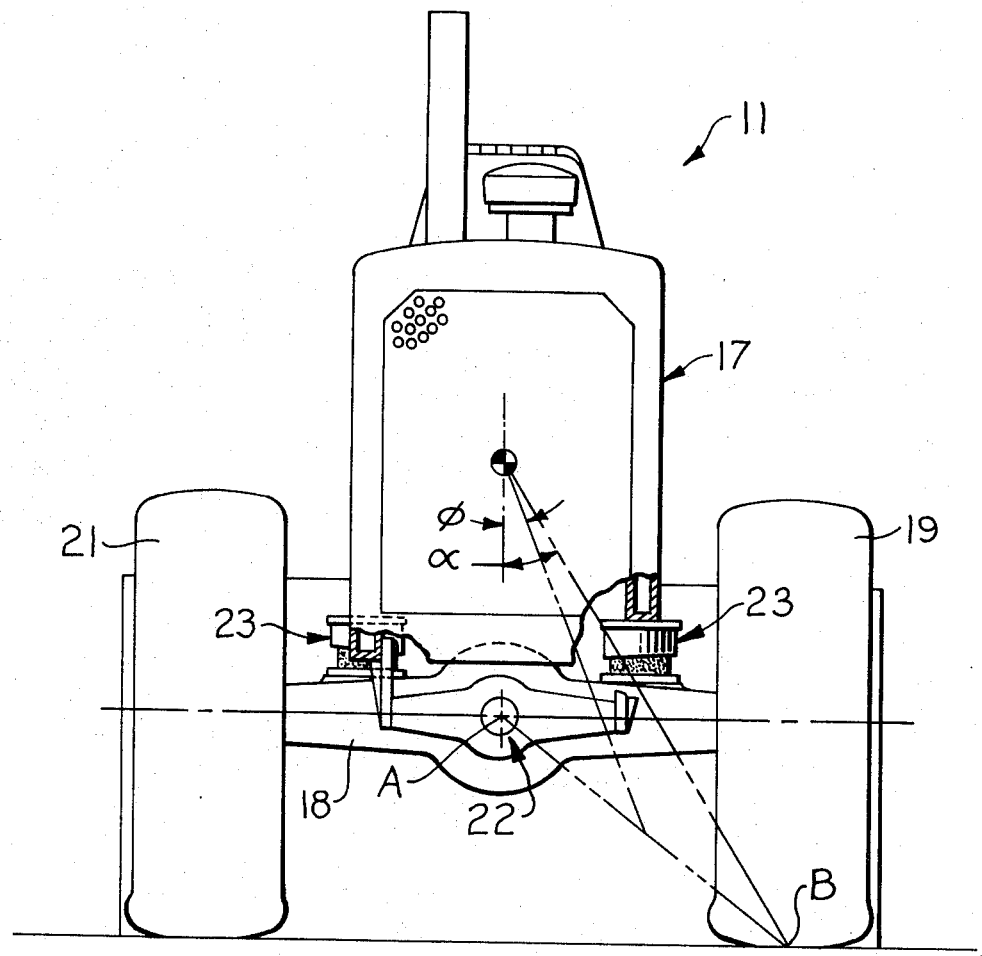
FIG. 1 is a rear end view with portions broken away of an articulated wheel loader embodying lateral stabilizing means in accordance with the present invention.
Figure 2:
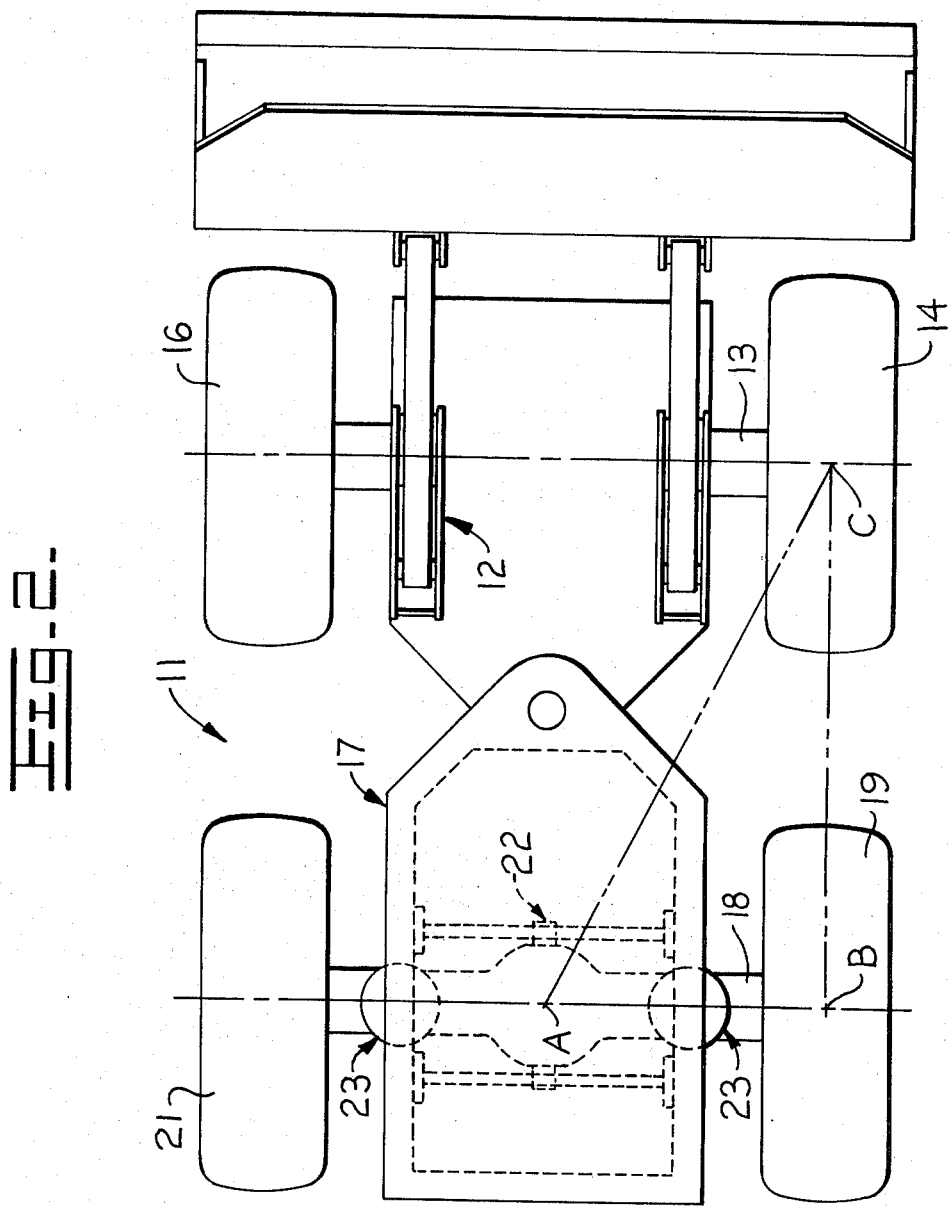
FIG. 2 is a plan view of the laterally stabilized loader of FIG. 1.

Referring now to the drawings in detail, particularly FIGS. 1 and 2, there is shown an articulated wheel loader 11 including a front frame 12 with rigid front axle 13 supporting front wheels 14 and 16, and a rear engine frame 17 with oscillating rear axle 18 supporting rear wheels 19 and 21. More particularly, rear axle 18 is mounted to the rear frame 17 as by means of a trunnion 22. The rear axle pivots about the trunnion to permit the rear wheels 19 and 21 to oscillate laterally about the rear frame. This oscillation is controlled normally by a pair of rigid stops, which limit the angle of movement to a definite value. Within the limits of the stops, the rear axle oscillates freely to allow the loader to traverse uneven ground while retaining all wheels on the ground for uniform tractive effort.

As has been noted previously, when the loader operates on side slopes or over rough terrain, the rear axle does not lend stability until the axle reaches its maximum point of oscillation or stop position, which is sometimes beyond the useful stability range.

To obviate this lateral instability problem, the stabilizing means of the present invention comprise a pair of rubber-like resilient compression members 23 disposed between rear frame 17 and rear axle 18 on laterally opposite sides of the trunnion 22. The members are compressively deflected between the frame and rear axle responsive to lateral oscillation of the latter to thereby generate restraining force which prevents unrestricted movement of the oscillating axle.

Figure 4:
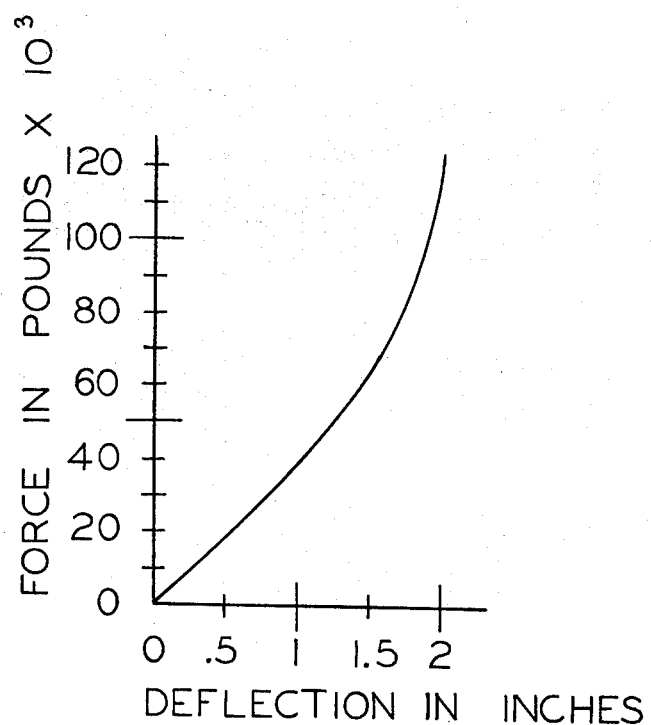
FIG. 4 is a graph of the optimum restraining force versus compressional deflection characteristic of the stabilizing means.

In accordance with a particularly important aspect of the invention, the members 23 are arranged to provide restraining force which is progressively greater, the larger the angle of axle oscillation. More particularly, the members are designed to have an exponentially increasing restraining force versus compressive deflection characteristic of the variety shown in FIG. 4. The illustrated graph depicts an optimum characteristic which varies substantially in accordance with a 1.65 exponential power. The specific values included on the graph are optimum for a Caterpillar Tractor Co. model 922 loader and will be seen to increase from a restraining force of about 18,000 pounds for 0.5 inch compressive deflection to about 38,000 pounds for 1 inch deflection, and about 120,000 pounds for 2 inch deflection.

The members 23 are mounted on the rear axle 18 to project upwardly therefrom into contact with the rear frame 17. With the opposite ends of the members thus simultaneously contacting the axle and frame with zero angle of oscillation, relatively free oscillation of the axle is still provided over a range of oscillation angles since the restraining force is relatively small until the oscillation angle becomes excessive and the restraining force rapidly increases. As further oscillation occurs, the members exert an increasing resistance to compression and restrain the axle against movement with increasing force between the axle and frame.

Alternatively, the members may be mounted with a clearance gap between their upper ends and the frame to permit entirely free oscillation of the axle until the clearance is traversed.

Figure 3:
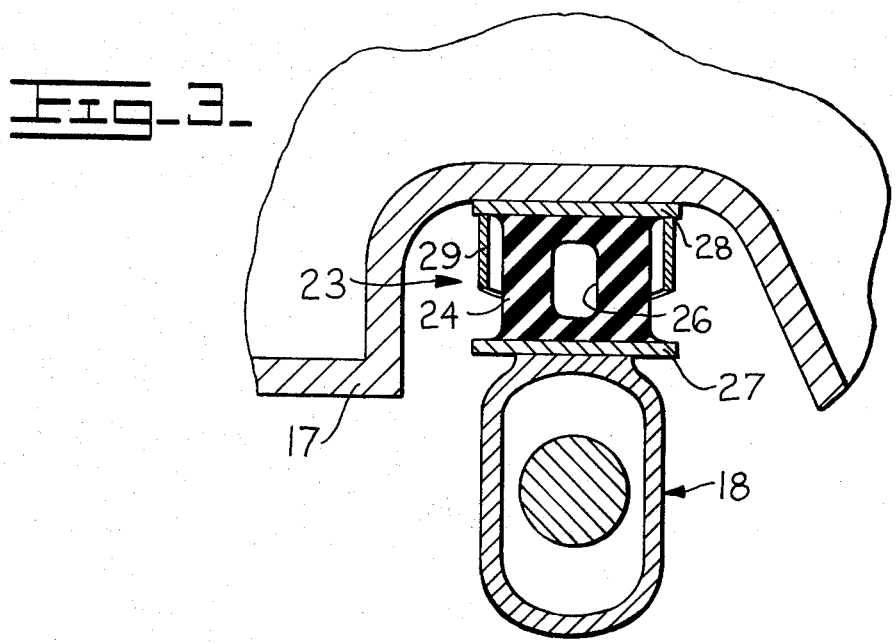
FIG. 3 is a fragmentary sectional view on an enlarged scale of a preferred embodiment of the stabilizing means.

Considering now the compression members 23 in more detail as to the preferred construction thereof and referring to FIG. 3, each member will be seen to include a cylindrical rubber pad 24 which is preferably hollow as indicated at 26. Lower and upper plates 27 and 28 are bonded to the opposite ends of the pad, the lower plate being secured atop the housing of axle 18 in a conventional manner, such as by bolting, welding, etc., and the upper plate providing a bearing surface for engaging the frame 17. In addition, a rigid metallic cylindrical casing 29 is preferably provided to depend from upper plate 28 in outwardly spaced circumferential relation to pad 24, the lower end of the casing being spaced from the lower plate 27 to provide a clearance gap therebetween.

The casing provides a solid stop that prevents the pad from flexing beyond its limit while serving as a solid stop between the axle and frame to positively limit axle oscillation. In addition, the casing protects the pad from damage by keeping out foreign material. The net advantage afforded by the casing is thus increased life of the pad. To provide the desired optimum restraining force versus compressive deflection characteristic depicted in FIG. 4, the hollow pad 24 is preferably of pure natural rubber with lamp black added and cured to a hardness of from 65 to 75 Durometer. However, a hollow or solid pad of a different material may be alternatively employed provided the material is such as to provide the proper spring rate.

With the compression members 23 installed on the loader 11 in the manner hereinbefore described, free or substantially free oscillation of the rear axle 18 is permitted when the loader operates on relatively smooth surfaces to thereby allow the loader to traverse uneven ground while retaining all wheels on the ground for uniform tractive effort.

When the loader is operated on side slopes or over extremely rough terrain, the compression members 23 improve lateral stability because the lateral tipping angle is increased. More particularly, as shown in FIG. 1, the increasing restraining force exerted on the rear axle 18 by the compression members causes the rear pivot point to move generally outward from point A, the pivot point of trunnion 22, to point B, the ground support point of one rear wheel 19. This changes the lateral tipping line from line AC extending diagonally between pivot point A and point C, the ground support point of front wheel 14, to line BC extending between the ground support points of the front and rear wheels. As a result, the lateral tipping angle necessary before the vehicle will roll over is increased from angle $\phi$, which lies inwardly of the wheels, to angle $\alpha$ which intersects line BC between the ground support points of the wheels. This substantial increase in tipping angle as the angle of rear axle oscillation is increased on side slopes or the like, of course materially improves the lateral stability of the loader under such operating conditions.

Although the invention has been hereinbefore described and illustrated in the accompanying drawings with respect to a preferred embodiment, it will be appreciated that numerous changes and modifications may be made therein without departing from the true spirit and scope of the invention, and thus it is not intended to limit the invention except by the terms of the appended claims.

What is claimed is:

1. In an articulated wheel loader including a front frame having a rigid front axle supporting front wheels and a rear frame having an oscillating rear axle supporting rear wheels, said rear axle being laterally pivotal with respect to said rear frame, lateral stabilizing means comprising a pair of rubber-like resilient compression members disposed between said rear axle and said rear frame on laterally opposite sides of the pivot point between said rear axle and rear frame, said members having a variable compressive displacement rate to impart a progressively increasing restraining force to said rear axle as the angle of oscillation thereof relative to said rear frame increases.

2. The combination of claim 1, further defined by each of said compression members having an exponentially increasing restraining force versus compressive deflection characteristic.

3. The combination of claim 2, further defined by said characteristic varying substantially in accordance with a 1.65 exponential power.

4. The combination of claim 1, further defined by each of said members comprising a cylindrical rubber pad having plates bonded to its opposite ends.

5. The combination of claim 4, further defined by a cylindrical casing projecting coaxially from one of said plates in outwardly spaced circumferential relation to said pad and terminating in longitudinally spaced relation to said second plate.

6. The combination of claim 4, further defined by said pad being hollow.

7. The combination of claim 6, further defined by a cylindrical casing projecting coaxially from one of said plates in outwardly spaced circumferential relation to said pad and terminating in longitudinally spaced relation to said second plate.

8. The combination of claim 6, further defined by said pad being of pure natural rubber cured to a hardness of from 65 to 75 Durometer.

9. The combination of claim 8, further defined by a cylindrical casing projecting coaxially from one of said plates in outwardly spaced circumferential relation to said pad and terminating in longitudinally spaced relation to said second plate.

* * * * *